United States Patent [19]

Weman et al.

[11] 3,895,539

[45] July 22, 1975

[54] LOCKING PAWL AND RATCHET WHEEL

[75] Inventors: Per Olaf Weman, Haslah; Harald Martin Schmelow, Ellerau, Kries Segeberg, both of Germany

[73] Assignee: Sigmatex A.G., Switzerland

[22] Filed: Jan. 17, 1974

[21] Appl. No.: 434,320

[52] U.S. Cl. ............... 74/575; 74/577 S; 242/107.4
[51] Int. Cl. ............................................ F16d 41/12
[58] Field of Search ............... 74/577 S, 577 R, 575; 242/107.4

[56] References Cited
UNITED STATES PATENTS

| | | | |
|---|---|---|---|
| 553,987 | 2/1896 | Heath et al. | 74/577 X |
| 1,153,085 | 9/1915 | Hunt | 74/577 S X |
| 1,290,507 | 1/1919 | Carroll | 74/577 S X |
| 1,338,641 | 4/1920 | Lux | 74/577 X |
| 2,046,462 | 7/1936 | Jorgensen | 74/577 S X |
| 2,158,429 | 5/1939 | Sale | 74/577 X |
| 2,353,648 | 7/1944 | Coffing et al. | 74/577 X |
| 3,343,765 | 9/1967 | Baker | 242/107.4 |
| 3,486,712 | 12/1969 | Hoday | 74/575 X |

Primary Examiner—Samuel Scott
Assistant Examiner—F. D. Shoemaker
Attorney, Agent, or Firm—John P. Kirby, Jr.

[57] ABSTRACT

The improved locking pawl of this invention is adapted for use with a ratchet wheel having ratchet teeth. The locking pawl has a locking surface, a sensing tip and a pivoting point. In the preferred embodiment, the locking pawl has a substantially arcuate shape, pivots in the same direction in which the ratchet wheel turns and the sensing tip is disposed on the periphery of the locking surface. In an alternate embodiment, the locking pawl has a sensing surface, pivots for engagement in a direction opposite to the direction in which the ratchet wheel turns and the sensing tip and the sensing surface are spaced apart from the locking surface. Both embodiments of the locking pawl, as well as the ratchet wheel associated therewith, are provided with case hardened zones and non-case hardened zones.

8 Claims, 6 Drawing Figures

PATENTED JUL 22 1975　　　3,895,539

LOCKING PAWL AND RATCHET WHEEL

BACKGROUND OF THE INVENTION

This invention relates to an improved locking pawl adapted to be used in conjunction with an improved ratchet wheel. Among the uses for the improved locking pawl of this invention is in vehicle safety belt retractors, such as those used in automobiles to lock the safety belt against withdrawal during emergency conditions, such as a collision.

Arrangements of a locking pawl to engage a ratchet tooth of a ratchet wheel are known. The problem with locking pawls known in the prior art is that they have a tendency to slip out of engagement with the ratchet wheel or to skip over some of the ratchet teeth of the ratchet wheel. This problem appears to be the result, at least in part, of slightly rounded edges either on the engaging surface of the pawl or on the engaging surface of the ratchet wheel, or both. This slight roundness on one or more of these surfaces may be the result of wear or the result of the use of unsharp die tools during the manufacturing process.

The need for alleviating this problem is especially strong in situations where it is important that the locking pawl engage the ratchet wheel immediately upon actuation of the pawl and in situations where it is important that the locking pawl not slip out of engagement after it has been actuated into engagement. Such situations exist, for example, where a locking pawl is used to engage a ratchet wheel in a locking mechanism for a safety belt retractor used in a vehicle, such as an automobile. Since the locking pawl is actuated so that the safety belt restrains the movement of the occupant of the vehicle during an emergency condition, such as a collision, it is important that the locking pawl does not malfunction, even for a short interval of time. Such a malfunction may be the result of skipping one or more ratchet teeth, thereby delaying initial engagement, or slipping out of engagement after the locking pawl has initially engaged a ratchet tooth. Such malfunctions of the locking pawl would mean that the retractor mechanism would not restrain the occupant, because it would allow the safety belt to be withdrawn. In an emergency condition, this would allow the occupant to be thrown forward in his seat and possibly be injured. In other words, this problem of a malfunctioning locking pawl goes to the heart of the need for such a locking mechanism in a retractor and to the heart of the purpose for a safety belt in a vehicle.

SUMMARY OF THE INVENTION

The improved locking pawl of this invention is adapted for use with a ratchet wheel having ratchet teeth. Two typical embodiments of the improved locking pawl are described. Both embodiments of the locking pawl have a locking surface for engagement with a ratchet tooth, a sensing tip for sensing the position of the ratchet tooth to be engaged, and a pivoting point upon which the locking pawl pivots for engagement with the ratchet wheel. When the locking pawl is brought into engagement with a ratchet tooth, the locking surface of the locking pawl is substantially perpendicular to a tangent of the ratchet wheel at the intersection of the ratchet tooth being engaged with the ratchet wheel and is substantially parallel to the locking surface of the ratchet tooth being engaged.

In a preferred embodiment, the locking pawl has a substantially arcuate shape, pivots in the same direction in which the ratchet wheel turns and the sensing tip is disposed on the periphery of the locking surface. In an alternate embodiment of the locking pawl, the locking pawl has a sensing surface, pivots for engagement in a direction opposite to the direction in which the ratchet wheel turns, and the sensing tip and the sensing surface are spaced apart from the locking surface. In both embodiments, the locking pawl may optionally have case hardened zones and non-case hardened zones. The improved ratchet wheel of this invention also has case hardened zones and non-case hardened zones.

Both embodiments of the locking pawl of this invention provide an arrangement whereby the locking pawl has much less tendency to slip out of engagement with the ratchet wheel or to skip over some of the ratchet teeth of the ratchet wheel when the locking pawl is first actuated for engagement. This is because the locking surface of the ratchet wheel is positioned during its engaging action substantially parallel to the locking surface on the ratchet tooth and substantially perpendicular to a tangent of the ratchet wheel at the point on the outer circumference of the ratchet wheel where the locking tooth to be engaged is located. This same arrangement also makes it much less likely that the locking pawl will skip over one or more ratchet teeth before it engages a ratchet tooth of the ratchet wheel. As a result, there is more positive engagement between the locking pawl and the ratchet wheel to lock the retractor and much less likelihood of delay in the locking action of the retractor or in malfunctioning of the locking pawl and ratchet wheel. The optional case hardened zones further contribute to the positive engagement of the locking pawl with the ratchet wheel.

DETAILED DESCRIPTION

An example of the retractor mechanism and the safety belt assembly in which the locking pawl of this invention may be used is described and illustrated in U.S. Pat. No. 3,343,765 to A. R. Baker and in U.S. Pat. No. 3,226,053 to J. W. L. Petty.

Figure 2:
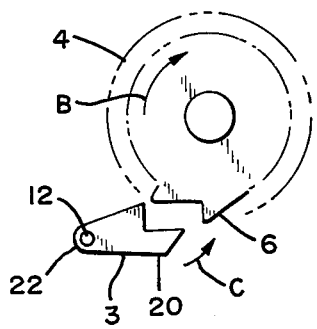
FIG. 2 is a schematic illustration of an alternate embodiment of this invention.
Figure 1:
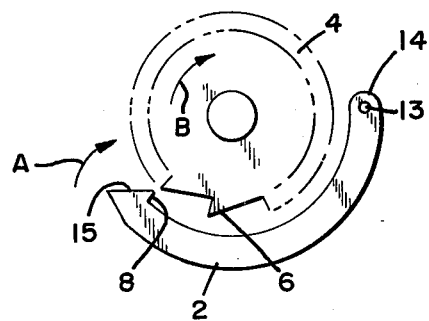
FIG. 1 is a schematic illustration of the preferred embodiment of this invention.
Figure 4:
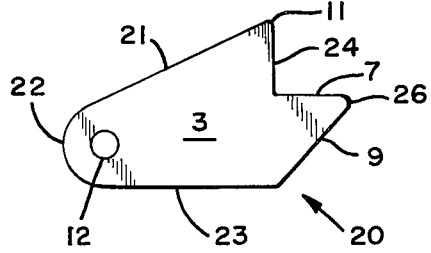
FIG. 4 is an enlarged view of the locking pawl shown in FIG. 2.
Figure 3:
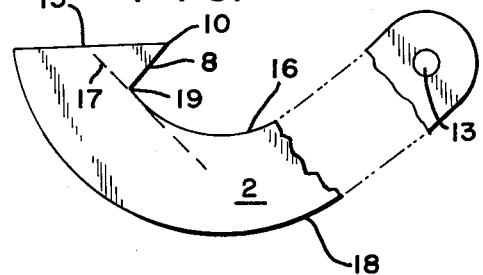
FIG. 3 is an enlarged view of a portion of the locking pawl shown in FIG. 1.
Figure 6:
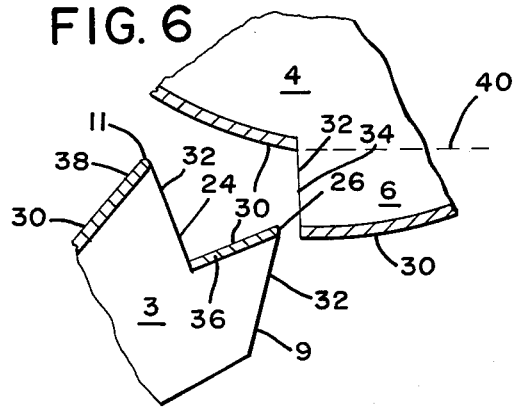
FIG. 6 is an enlarged view of a locking tooth of the ratchet wheel and a portion of the locking pawl shown in FIG. 2.
Figure 5:
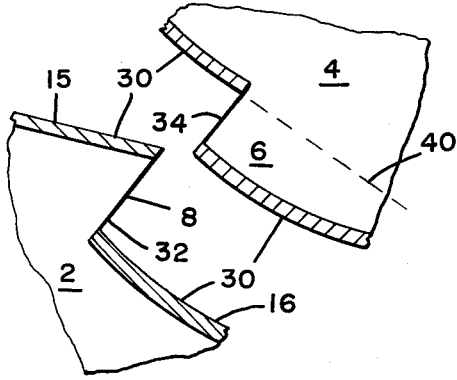
FIG. 5 is an enlarged view of a locking tooth of the ratchet wheel and a portion of the locking pawl shown in FIG. 1.

Referring to FIGS. 1 and 2, the two embodiments of the improved locking pawls 2 and 3 of this invention are structural members adapted to be pivoted into locking engagement with a ratchet wheel 4 and having ratchet teeth 6. Referring to FIGS. 1, 2, 3 and 4, the locking pawls 2 and 3 include a locking surface 8 or 9, a sensing tip 10 or 11, and a pivoting point 12 or 13. The locking surfaces 8 and 9 are adapted for engagement with a ratchet tooth 6 of the ratchet wheel 4. The sensing tips 10 and 11 are adapted for mechanically sensing the position of the ratchet tooth 6 to be engaged by the locking surface 8 or 9. The sensing tips 10 and 11 help to avoid skipping one or more ratchet teeth 6 before engagement of the ratchet wheel 4 by the locking pawl 2 or 3. The locking pawls 2 and 3 pivot on the pivoting point 12 or 13 for engagement with the ratchet wheel 4. When the locking pawls 2 and 3 are brought into engagement with a ratchet tooth 6, the locking surface 8 or 9 of the locking pawls 2 and 3 are substantially perpendicular to the ratchet wheel 6. This perpendicular engagement will be explained in more detail subsequently in reference to each of the two separate embodiments: locking pawl 2 which is illustrated in FIGS. 1, 3 and 5; and locking pawl 3 which is illustrated in FIGS. 2, 4 and 6.

Referring to FIGS. 1 and 3, which illustrate the preferred embodiment of the locking pawl 2, the locking pawl 2 has an elongated substantially arcuate shape, an engaging end 15, a pivoting end 14, and a sensing tip 10. The arcuate shape of the locking pawl 2 has an interior arc 16 and an exterior arc 18; the interior arc 16 being disposed closer to the ratchet wheel 4 than the exterior arc 18. The engaging end 15 which is the end that engages the ratchet wheel 4 is at the opposite end of the locking pawl 2 from the pivoting end 14 on which the locking pawl 2 pivots by means of pivot point 13. The sensing tip 10 and the locking surface 8 of the locking pawl 2 are disposed on the interior arc 16 of the locking pawl 2. The sensing tip 10 is adapted to mechanically sense the presence of the ratchet tooth 6.

The locking surface 8 is a substantially flat surface disposed approximately perpendicular to a tangent 17 of the interior arc 16 of the locking pawl 2 at the point 19 where the locking surface 8 meets the interior arc 16. The sensing tip 10 is disposed on the locking surface 8 which is closer to the ratchet wheel 4, as distinguished from the opposite periphery of the locking surface 8 which is closer to the interior arc 16 of the locking pawl 2. Locking pawl 2 forms an arc in the range of from approximately 90° to approximately 180°, measured from engaging end 15 to pivoting end 14. It has been found that this arrangement, i.e., the arcuate shape of the locking pawl 2, with the pivot point 13 spaced apart from the locking surface 8 by 90° to 180°, facilitates the perpendicular engagement of the locking pawl 2 with the ratchet tooth 6.

The locking pawl 2 pivots upon pivot point 13 to engage the ratchet wheel 4 in the same direction of rotation as the direction in which the ratchet wheel 4 rotates. Thus, the locking pawl 2 illustrated in FIG. 1 is adapted to pivot in the direction of arrow A in order to engage the ratchet wheel 4 which is the same direction in which the ratchet wheel 4 turns, as indicated by arrow B. Thus, if the ratchet wheel 4 turns in a clockwise direction, for example, to allow withdrawal of a safety belt which it would upon a reel (not shown) in a clockwise direction, then the locking pawl 2 pivots about its pivot point 13 in a clockwise direction when being moved to engage the ratchet wheel 4. Similarly, if the ratchet wheel 4 were to turn in the counterclockwise direction, for example, to allow withdrawal of a safety belt which is wound upon a reel (not shown) in a counterclockwise direction, the locking pawl 2 would pivot about its pivot point 13 in a counterclockwise direction when being moved to engage the ratchet wheel 4.

Referring to FIG. 5, the arrangement of the locking pawl 2 is such that when locking pawl 2 is brought into engagement with ratchet tooth 6, locking surface 8 of locking pawl 2 is substantially perpendicular to a tangent 40 of ratchet wheel 4 at the intersection of locking surface 34 of ratchet tooth 6 with ratchet wheel 4. Locking surface 34 of ratchet tooth 6 is also substantially perpendicular to tangent 40. Locking surface 8 of locking pawl 2 is substantially parallel to locking surface 34 of ratchet tooth 6 during engagement. The substantially perpendicular arrangement of locking surface 8 results in more immediate, positive and secure locking action and less likelihood of the locking pawl 2 slipping out of engagement.

Referring to FIG. 5, the locking pawl 2 optionally has case hardened zones 30 and non-case hardened zones 32. The case hardened zones 30 are surface areas which have been 500° to produce a hardened surface which is resistant to wear. The use of case hardening helps to prevent the development of roundness on the edges of the surfaces having case hardening. Case hardening, per se, is described in the "Encyclopedia of Chemical Technology," edited by R. E. Kirk and D. F. Othmer, Volume 9, pages 23 and 349. Case hardening may be accomplished by nitriding the machined steel surfaces by heat-treating them so as to produce a sorbitic structure. Then, the surfaces are exposed to the action of ammonia at approximately 500° – 540°C. The nitrogen formed by dissociation of the ammonia in contact with the metal penetrates the metal for a considerable depth and combines with the aluminum and chromium to precipitate very small, needle-shaped crystalline nitrides. The presence of these hard particles imparts exceptional hardness to the nitrided case. The hardness is retained up to 450°C. and provides great resistance to wear. Since the nitriding temperature is relatively low, the surfaces can be nitrided with a minimum of distortion.

The non-case hardened zones 32 are surface areas which have not been treated. The case hardened zones 30 are disposed on the interior arc 16 of the locking pawl 2 near the locking surface 8 and on the engaging end 15 of the locking pawl 2. The non-case hardened zones 32 are disposed on the locking surface 8 of the locking pawl 2. The case hardened zones 30 are also disposed on the outer circumference of each ratchet tooth 6 of the ratchet wheel 4, but not on the locking surfaces 34 of each ratchet tooth 6. The locking surfaces 34 of the ratchet teeth 6 have non-case hardened zones.

Referring to FIGS. 2 and 4, which illustrate an alternate embodiment of the locking pawl 3 of this invention, the locking pawl 3 includes an engaging end 20 which engages a ratchet tooth 6 of the ratchet wheel 4 and a pivoting end 22 having a pivot point 12 upon which the locking pawl 3 pivots. The engaging end 20 is at the opposite end of the locking pawl 3 from the pivoting end 22. Referring to FIG. 4, the locking pawl 3 also has a sensing surface 24. The sensing tip 11 is disposed on the periphery of the sensing surface 24 which is closer to the ratchet wheel 4. The locking pawl 3 also has a locking tip 26 disposed on the periphery of the locking surface 9 which is closer to the ratchet wheel 4. The sensing tip 11 and the sensing surface 24 are spaced apart from the locking surface 9 and the locking tip 26 in the alternate embodiment illustrated in FIGS. 2 and 4. The distance measured along the surface 7 between the locking tip 26 and the sensing surface 24 with its sensing tip 11 is slightly less than the distance between adjacent ratchet teeth 6 on the ratchet wheel 4. The sensing tip 11 is adapted to mechanically sense the presence of a ratchet tooth 6 and cause the locking surface 9 to engage the next ratchet tooth 6.

The locking pawl 3 has an irregular and generally triangular shape. The hypotenuse of the generally triangular shape is formed by side 21 which extends between pivoting end 22 and sensing tip 11. One leg of the generally triangular shape is formed by side 23 which extends between the pivoting end 22 and the locking surface 9. The other leg of the generally triangular shape is irregular because it includes locking surface 9, surface 7 and sensing surface 24. Surface 7 is approximately perpendicular to sensing surface 24. Surface 7 forms an approximate angle of 45° with locking surface 9. Locking surface 9 forms an approximate angle of 135° with side 23. Optionally, pivoting end 22 may be rounded. The shape of locking pawl 3 is not critical, particularly as to sides 21 and 23 and pivoting end 22. This arrangement of sensing tip 11 and sensing surface 24 spaced apart from locking surface 9 and the angle of approximately 135° between locking surface 9 and side 23 facilitates the perpendicular engagement of the locking pawl 3 with the ratchet tooth 6.

The locking pawl 3 pivots upon pivot point 12 to engage the ratchet wheel 4 in a direction of rotation opposite to the direction in which the ratchet wheel 4 rotates. Thus, the locking pawl 3 illustrated in FIG. 2 is adapted to pivot in the direction of the arrow C in order to engage the ratchet wheel 4, which is opposite to the direction in which the ratchet wheel 4 turns, as indicated by the arrow B. Thus, if the ratchet wheel 4 turns in a clockwise direction, for example, to allow withdrawal of the safety belt which is wound upon a reel (not shown) in a clockwise direction, then the locking pawl 3 pivots about its pivot point 12 in a counterclockwise direction when being moved to engage the ratchet wheel 4. Similarly, if the ratchet wheel 4 were to turn in the counterclockwise direction, for example, to allow withdrawal of the safety belt which is wound upon a reel (not shown) in a counterclockwise direction, the locking pawl 3 would pivot about its pivot point 12 in a clockwise direction when being moved to engage the ratchet wheel 4.

Referring to FIG. 6, the arrangement of the locking pawl 3 is such that when locking pawl 3 is brought into engagement with ratchet tooth 6, locking surface 9 of locking pawl 3 is substantially perpendicular to a tangent 40 of ratchet wheel 4 at the intersection of locking surface 34 of ratchet tooth 6 with ratchet wheel 4. Locking surface 34 of ratchet tooth 6 is also substantially perpendicular to tangent 40. Locking surface 9 of locking pawl 3 is substantially parallel to locking surface 34 of ratchet tooth 6 during engagement. The substantially perpendicular arrangement of locking surface 9 results in more immediate, positive and secure locking action and less likelihood of the locking pawl 3 slipping out of engagement.

Referring to FIG. 6, the locking pawl 3 optionally has case hardened zones 30 and non-case hardened zones 32. The case hardened zones 30 are surface areas which have been treated to produce a hardened surface which is resistant to wear. The use of case hardening helps to prevent the development of roundness on the edges of the surfaces having case hardening. As previously explained in reference to the preferred embodiment, illustrated in FIGS. 1, 3 and 5, case hardening may be accomplished by nitriding the machined steel surfaces by heat-treating them so as to produce a sorbitic structure. Then, the surfaces are exposed to the action of ammonia at approximately 500° – 540°C.

The non-case hardened zones 32 are surface areas which have not been treated. The case hardened zones 30 are disposed on the surface 36 of the locking pawl 3 between the locking tip 26 and the sensing surface 24 and on the surface 38 of the locking pawl 3 between the sensing tip 11 and the pivoting end 22. The non-case hardened zones 32 are disposed on the locking surface 9 and on the sensing surface 24. The case hardened zones 30 are also disposed on the outer circumference of each ratchet tooth 6 of the ratchet wheel 4, but not on the locking surfaces 34 of each ratchet tooth 6. The locking surfaces 34 of the ratchet teeth 6 have non-case hardened zones.

Referring to both the preferred embodiment of FIG. 5 and the alternate embodiment of FIG. 6, the use of case hardened zones 30 helps to prevent the development of roundness on the edges of the surfaces. This helps to prevent the locking pawl 2 and 3 from slipping out of engagement and facilitates positive locking.

We claim:

1. An improved locking pawl adapted for use with a wheel having ratchet teeth, said pawl comprising: a locking surface for engagement with a ratchet tooth, said locking surface being substantially perpendicular to a tangent of said ratchet wheel at said ratchet tooth; a sensing tip for sensing the position of said ratchet tooth to be engaged by said locking surface; and a pivoting point on which said locking pawl pivots for engagement with said ratchet wheel; wherein said locking pawl has a substantially arcuate shape in the range of approximately 135° to 180°, said arcuate shape having an interior arc and an exterior arc, said interior arc being disposed closer to said ratchet wheel than said exterior arc; an engaging end which engages said ratchet tooth of said wheel and a pivoting end on which said locking pawl pivots; said sensing tip and said locking surface of said locking pawl being disposed on said engaging end of said locking pawl and being disposed on the interior arc of said locking pawl.

2. The locking pawl according to claim 1 wherein said locking surface is a substantially flat surface disposed approximately perpendicular to said interior arc of said locking pawl and said sensing tip is disposed on the periphery of said locking surface which is closer to said ratchet wheel.

3. The locking pawl according to claim 1 wherein said locking pawl pivots to engage said ratchet wheel in the same direction in which said ratchet wheel turns; the surface of said locking pawl has case hardened zones and non-case hardened zones, said case hardened zones being disposed on said interior arc of said locking pawl and on the engaging end of said locking pawl and said non-case hardened zones being disposed on said locking surfaces; and said ratchet wheel has case hardened and non-case hardened zones, said case hardened zones being disposed on the outer circumference of said ratchet teeth and said non-case hardened zones being disposed on the locking surface of said ratchet teeth.

4. An improved locking pawl adapted for use with a wheel having ratchet teeth, said pawl comprising: a locking surface for engagement with a ratchet tooth, said locking surface being substantially perpendicular to a tangent of said ratchet wheel at said ratchet tooth; a sensing tip for sensing the position of said ratchet tooth to be engaged by said locking surface; and a pivoting point on which said locking pawl pivots for engagement with said ratchet wheel; wherein said locking pawl further comprises: an engaging end which engages said ratchet tooth of said wheel and a pivoting end at which said locking pawl pivots; a sensing surface, said sensing tip being disposed on the periphery of said sensing surface which is closer to said ratchet wheel, said sensing tip and said sensing surface being spaced apart from said locking surface.

5. The locking pawl according to claim 4 wherein said locking pawl pivots to engage said ratchet wheel in a direction opposite to the direction in which said ratchet wheel rotates; the surface of said locking pawl has case hardened zones and non-case hardened zones, said case hardened zones being disposed on the side of the locking pawl between the locking tip and the sensing surface and the side between the sensing tip and the pivoting end, and said non-case hardened zones being disposed on said sensing surface and said locking surface; and said ratchet wheel has case hardened zones and non-case hardened zones, said case hardened zones being disposed on the outer circumference of said ratchet teeth and said non-case hardened zones being disposed on the locking surfaces of said ratchet teeth.

6. The locking pawl according to claim 4 wherein the distance between said locking surface and said sensing surface is slightly less than the distance between adjacent teeth on said ratchet wheel.

7. An improved locking pawl adapted for use with a wheel having ratchet teeth, said locking pawl having a substantially arcuate shape of approximately 150°, said arcuate shape having an interior arc and an exterior arc, said interior arc being disposed closer to said wheel than said exterior arc, said locking pawl comprising: a locking surface for engagement with a ratchet tooth, said locking surface being substantially perpendicular to a tangent of said ratchet wheel at said ratchet tooth; a sensing tip for sensing the position of said ratchet tooth to be engaged by said locking surface; a pivoting point on which said locking pawl pivots for engagement with said ratchet wheel in the same direction in which said ratchet wheel rotates; an engaging end which engages a ratchet tooth of said ratchet wheel; a pivoting end on which said locking pawl pivots, said pivoting end being at the opposite end of said locking pawl from said engaging end; said sensing tip and said locking surface of said locking pawl being disposed on said engaging end of said locking pawl and being disposed on the interior arc of said locking pawl; said locking surface being a substantially flat surface disposed approximately perpendicular to said interior arc of said locking pawl and said sensing tip being disposed on said periphery of said locking surface which is closer to said ratchet wheel.

8. An improved locking pawl adapted for use with a wheel having ratchet teeth, said locking pawl comprising: a locking surface for engagement with a ratchet tooth, said locking surface being substantially perpendicular to a tangent of said ratchet wheel at said ratchet tooth; a sensing surface; a sensing tip for sensing the position of said ratchet tooth to be engaged by said locking surface, said sensing tip being disposed on the periphery of said sensing surface which is closer to said ratchet wheel, said sensing tip and said sensing surface being spaced apart from said locking surface; an engaging end which engages a ratchet tooth of said ratchet wheel; a pivoting end at which said locking pawl pivots, said pivoting end being at the opposite end of said locking pawl from said engaging end; a pivoting point on which said locking pawl pivots for engagement with said ratchet wheel in a direction opposite to the direction in which said ratchet wheel rotates.

* * * * *